(12) United States Patent  (10) Patent No.: US 8,764,581 B2
Ichikawa  (45) Date of Patent: Jul. 1, 2014

(54) SYSTEMS AND METHODS FOR MANUFACTURING A GOLF BALL

(75) Inventor: Yasushi Ichikawa, Tualatin, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 12/856,330

(22) Filed: Aug. 13, 2010

(65) Prior Publication Data

US 2012/0040775 A1 Feb. 16, 2012

(51) Int. Cl.
*A63B 37/04* (2006.01)

(52) U.S. Cl.
USPC .......................................... 473/371; 473/374

(58) Field of Classification Search
USPC ..................... 425/116, 120, 573, 477, 812
See application file for complete search history.

(56) References Cited

U.S. PATENT DOCUMENTS

| | | | |
|---|---|---|---|
| 3,700,380 A | 10/1972 | Kitrilakis | |
| 4,182,641 A * | 1/1980 | Fitts | 156/77 |
| 4,196,070 A | 4/1980 | Chao et al. | |
| 4,556,096 A | 12/1985 | Nagata et al. | |
| 4,705,809 A | 11/1987 | Dighton et al. | |
| 4,892,544 A * | 1/1990 | Frisch | 128/898 |
| 5,050,886 A * | 9/1991 | Yamagishi et al. | 473/372 |
| 5,965,076 A * | 10/1999 | Banks et al. | 264/219 |
| 5,975,869 A * | 11/1999 | Shimosaka et al. | 425/116 |
| 6,103,166 A | 8/2000 | Boehm et al. | |
| 6,186,906 B1 * | 2/2001 | Sullivan et al. | 473/351 |
| 6,213,893 B1 | 4/2001 | Maruko | |
| 6,270,429 B1 * | 8/2001 | Sullivan | 473/374 |
| 6,296,578 B1 | 10/2001 | Masutani | |
| 6,315,915 B1 | 11/2001 | Hebert et al. | |
| 6,361,453 B1 * | 3/2002 | Nakamura et al. | 473/371 |
| 6,634,962 B2 * | 10/2003 | Sullivan | 473/374 |
| 6,648,776 B1 | 11/2003 | Boehm et al. | |
| 6,866,802 B2 | 3/2005 | Puniello et al. | |
| 2002/0016223 A1 * | 2/2002 | Sullivan | 473/374 |
| 2002/0030297 A1 * | 3/2002 | Gallagher et al. | 264/49 |
| 2005/0129901 A1 * | 6/2005 | Swindler et al. | 428/76 |
| 2005/0167877 A1 * | 8/2005 | Nun et al. | 264/143 |
| 2005/0233835 A1 * | 10/2005 | Nesbitt | 473/371 |
| 2009/0206513 A1 | 8/2009 | Tamura et al. | |

FOREIGN PATENT DOCUMENTS

| | | |
|---|---|---|
| CN | ZL201120293193.6 | 8/2012 |
| EP | 0478279 A2 | 4/1992 |
| JP | 55090361 | 7/1980 |
| JP | 59129186 | 7/1984 |
| JP | 61185538 | 8/1986 |
| JP | H01271438 | 10/1989 |
| JP | 2000237349 | 9/2000 |

OTHER PUBLICATIONS

Partial European Search Report dated Nov. 28, 2011 in European Patent Application No. 11177097.0.

(Continued)

*Primary Examiner* — Gene Kim
*Assistant Examiner* — John E Simms, Jr.
(74) *Attorney, Agent, or Firm* — Plumsea Law Group, LLC (57) ABSTRACT

Embodiments provide systems and methods for manufacturing a multilayer golf ball having strong inter-layer bonding and desired structural characteristics, provided by including temporary, removable particles in a golf ball substrate and then removing the particles to form voids in the substrate, including the outer surface and interior of the substrate. Golf balls having the resulting strong inter-layer bonding and structural characteristics are also disclosed.

24 Claims, 5 Drawing Sheets

(56) References Cited

OTHER PUBLICATIONS

Extended European Search Report in European Patent Application No. EP11177097.0, mailed on Mar. 27, 2012.
Notification of Grant of Patent Right for Utility Model for Chinese Utility Model Patent Application No. 201120293193.6, issued on Apr. 12, 2012.
Response to Official Communication dated May 2, 2012 for European Patent Application No. 11 177 097.0, as filed on Sep. 14, 2012.
Communication pursuant to Article 94(3) EPC for European Patent Application No. 11 177 097.0, mailed on Oct. 19, 2012.
Response to Official Communication dated Oct. 19, 2012 for European Patent Application No. 11 177 097.0, as filed on Jan. 8, 2013.
Communication pursuant to Article 94(3) EPC for European Patent Application No. 11 177 097.0, mailed on Jan. 28, 2013.
Office Action issued Sep. 30, 2013 in Japanese Patent Application No. 2011-170296 and English translation thereof.
Official Letter and Search Report in Taiwan Patent Application No. 100123651.
Notification of First Office Action dated Sep. 4, 2013 in Chinese Patent Application No. 201110231253.6 and English translation thereof, 8 pages.
Communication Pursuant to Article 94(3) EPC dated Jul. 3, 2013 in European Patent Application No. 11 177 097.0, 3 pages.
Office Action issued Jan. 7, 2014 in European Patent Application No. 11177097.0.
Response to Office Action dated Dec. 4, 2013 in Chinese Patent Application No. 201110231253.6 and English translation thereof.
Response to Official Letter and Search Report, filed Mar. 25, 2014 in Taiwan Patent Application No. 100123651, and English translation thereof.
Response to Office Action filed Mar. 6, 2014 in Japanese Patent Application No. 2011-170296 and English translation thereof.
Response to Office Action filed Mar. 27, 2014 in European Patent Application No. 11177097.0.

* cited by examiner

FIG. 6

SYSTEMS AND METHODS FOR MANUFACTURING A GOLF BALL

BACKGROUND

The present invention relates to multilayer golf balls and to systems and methods for manufacturing multilayer golf balls, and more particularly, to golf ball manufacturing systems and methods that mold small particles into a golf ball substrate, which may then be removed to form voids in the substrate, including the outer surface and interior of the substrate.

Most conventional golf balls are constructed of at least two layers of material. These multilayer golf balls come in two principal varieties: wound golf balls and solid golf balls. Wound golf balls typically have at least three layers, including a center core, a wound layer surrounding the core, and a cover surrounding the wound layer. Multilayer solid golf balls have a solid core and one or more layers surrounding the core. Multilayer solid golf balls having a single solid core and a single cover layer are the most popular commercial products and are generally referred to as "two-piece" golf balls.

In multilayer golf balls, individual outer layers may be formed by molding them around an underlying substrate, such as an intermediate layer (sometimes referred to as a mantle layer) or core. The outer layers may be formed by, for example, injection molding, compression molding, and casting the outer layer material around the underlying substrate. To provide optimal performance requirements, an outer layer is preferably strongly bonded to its adjacent underlying substrate.

With wound balls, the inter-layer adhesion may be facilitated between an outer layer (e.g., cover) and its underlying wound layer due to the uneven surfaces and texture provided by the thread windings of the wound layer. The material of the outer layer flows into and around these surfaces and texture when the outer layer is molded around the wound layer, resulting in improved adhesion. In contrast, between even layers that are not wound, in either wound or solid golf balls, adhesion between the layers may be greatly reduced due to the smooth interfaces between the layers.

Improper inter-layer adhesion may significantly detract from the durability and play characteristics of a golf ball. For example, poor adhesion may cause empty cavities and other weaknesses between layers, resulting in delamination when a golf ball is subjected to impacts, such as from golf clubs or other hard surfaces. The delamination may detract from the aesthetics and playability of a golf ball. In addition, when the cover of a golf ball is cut or otherwise damaged, improper inter-layer adhesion may cause pieces of the cover to separate from the inner layer and fall off, leading to further disintegration of the golf ball.

Improper inter-layer adhesion may also adversely impact the spin characteristics of a golf ball. For example, improper inter-layer adhesion may cause a loss in shear stress generated in the ball, which may hinder a player's ability to apply a desired spin to the ball with a club having a large loft angle. This tendency toward a decreased spin due to loss in shear stress may be especially critical at the interface between the cover layer and its adjacent underlying substrate, where spinning characteristics are most affected.

Golf ball manufacturers have attempted to improve adhesion between layers by forming texture or other surface features in substrates. Those manufacturing techniques have included molding a golf ball layer with a mold cavity having a roughened surface, or forming surface features in the surface of an already formed substrate using low pressure plasma treatment, a corona discharge treatment, chemical etching, or shot blast finishing. These techniques, however, often require additional time, tooling, and manufacturing equipment, which may increase the costs and duration of production.

Accordingly, there remains a need for more efficiently manufacturing multilayer golf balls having strong inter-layer bonds, and for multilayer golf balls having improved inter-layer bonds.

SUMMARY

Embodiments provide systems and methods for manufacturing multilayer golf balls, in which particles are disposed in an outer surface of a golf ball substrate, and are then removed to form voids in the outer surface of the substrate.

One aspect provides a method for manufacturing a golf ball, which may include forming a substrate of the golf ball, the substrate having an outer surface; disposing removable particles at the outer surface of the substrate such that at least a portion of each of the removable particles is exposed at the outer surface of the substrate; removing the removable particles from the outer surface of the substrate to form voids in the outer surface; and forming a layer over the substrate such that material of the layer occupies the voids.

In another aspect, the removable particles may comprise soluble material, removal of the removable particles may comprise applying a solvent to the substrate, and the solvent may comprise a substance that dissolves the soluble material.

In another aspect, the removable particles may comprise water-soluble particles, and the solvent may comprise water.

In another aspect, forming the substrate and disposing the removable particles at the outer surface of the substrate may comprise applying the removable particles to a surface of a mold, injecting a substrate material in liquid form into the mold and over the removable particles, and solidifying the liquid substrate material with the removable particles embedded in the substrate material.

In another aspect, applying the removable particles to the surface of the mold may comprise spraying the removable particles onto the surface of the mold.

In another aspect, applying the removable particles to the surface of the mold may comprise applying the removable particles in a uniform distribution.

In another aspect, applying the removable particles to the surface of the mold may comprise applying the removable particles in a random distribution.

In another aspect, forming the substrate and disposing the removable particles at the outer surface of the substrate may comprise mixing particles with a substrate material to form a mixture, injecting the mixture into a mold, with the particles suspended throughout the mixture, and with a plurality of the particles disposed against the mold and comprising the removable particles, and solidifying the mixture to form the substrate, with the removable particles exposed at the outer surface of the substrate.

In another aspect, a second plurality of the particles may be disposed within the substrate and may comprise non-exposed removable particles, and the method may further comprise removing the non-exposed removable particles from the substrate to form closed voids in the substrate.

In another aspect, the particles mixed with the substrate to form the mixture may comprise soluble particles dissolvable in a solvent, and wherein removing the removable particles from the outer surface of the substrate and the non-exposed removable particles from the substrate may comprise applying the solvent to the substrate.

In another aspect, forming the layer over the substrate may comprise molding the layer material in liquid form over the substrate.

In another aspect, the layer may comprise a cover of the golf ball and the substrate may comprise one of an intermediate layer and a core of the golf ball.

In another aspect, the layer may comprise a first layer, and forming the first layer over the substrate may comprise disposing second removable particles at an outer surface of the first layer, and removing the second removable particles from the outer surface of the first layer to form voids in the outer surface of the first layer. A second layer may be formed over the first layer such that material of the second layer occupies the voids in the outer surface of the first layer.

In another aspect, disposing the second removable particles at the outer surface of the first layer may comprise applying the second removable particles to a surface of a second mold, placing the substrate inside the second mold, injecting a first layer material in liquid form into the second mold, between the substrate and the second mold, and over the second removable particles, and solidifying the liquid first layer material with the second removable particles embedded in the first layer material.

In another aspect, removing the removable particles may comprise one of physically contacting the removable particles with force and pneumatically contacting the removable particles with air.

In another aspect, the removable particles may comprise one of fluid-filled microcapsules, gas-filled microcapsules, and gel microbeads, and removing the removable particles may comprise heating the removable particles.

In another aspect, removing the removable particles may comprise selectively heating the removable particles without appreciably heating the substrate.

In another aspect, forming the substrate and disposing the removable particles at the outer surface of the substrate may comprise applying the removable particles to an outer surface of a preformed golf ball portion, forming a substrate over the outer surface of the preformed golf ball portion and around the removable particles, and limiting a thickness of the substrate such that at least a portion of each of the removable particles is exposed at an outer surface of the substrate.

Another aspect provides a multilayer golf ball comprising a substrate and an outer layer. The substrate may have an outer surface, wherein the substrate defines a plurality of discrete voids having openings at the outer surface, and wherein each void of the plurality of discrete voids has an opening narrower than an interior dimension of the each void. The outer layer may be disposed over the outer surface of the substrate, wherein the outer layer comprises protruding portions that occupy the plurality of discrete voids, and wherein each protruding portion has a dimension that is wider than the opening of the void that the each protruding portion occupies, such that the each protruding portion cannot pass through the opening.

In another aspect, the discrete voids may be uniformly distributed at the outer surface of the substrate.

In another aspect, the golf ball may further comprise a plurality of particles dispersed and encased throughout the substrate. The particles may be sized and shaped substantially similar to the voids.

In another aspect, the golf ball may further comprise a plurality of closed voids dispersed and encased throughout the substrate, wherein the closed voids may be sized and shaped substantially similar to the discrete voids.

In another aspect, the golf ball may further comprise a golf ball portion underlying the substrate. The substrate may contact the golf ball portion at an inner surface. Each void of the plurality of discrete voids may extend from the inner surface to the outer surface of the substrate.

In another aspect, each void of the plurality of discrete voids may be spherical.

In another aspect, the outer layer may have an outer surface opposite to the substrate. The outer layer may define a second plurality of discrete voids having openings at the outer surface of the outer layer. Each void of the second plurality of discrete voids may have an opening narrower than an interior dimension of the each void of the second plurality of discrete voids. The golf ball may further comprise a second outer layer disposed over the outer surface of the outer layer. The second outer layer may comprise protruding portions that occupy the second plurality of discrete voids. Each protruding portion of the second outer layer may have a dimension that is wider than the opening of the void that the each protruding portion of the second outer layer occupies, such that the each protruding portion of the second outer layer cannot pass through the opening.

Another aspect provides a golf ball made by a process, which may comprise forming a substrate of the golf ball, the substrate having an outer surface; disposing removable particles at the outer surface of the substrate such that at least a portion of each of the removable particles is exposed at the outer surface of the substrate; removing the removable particles from the outer surface of the substrate to form voids in the outer surface; and forming a layer over the substrate such that material of the layer occupies the voids.

In another aspect, each void may have an opening at the outer surface of the substrate that is narrower than an interior dimension of the each void.

Other systems, methods, features and advantages of the invention will be, or will become, apparent to one of ordinary skill in the art upon examination of the following figures and detailed description. It is intended that all such additional systems, methods, features and advantages included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 5.1 is a schematic diagram and flowchart illustrating an embodiment of a method and system for manufacturing a golf ball having a substrate with voids at the outer surface of the substrate, using removable small particles dispersed throughout the substrate.

FIG. 5.2 is a schematic diagram illustrating an embodiment of a method and system for manufacturing a golf ball having a substrate with voids throughout the substrate, using removable small particles dispersed throughout the substrate.

DETAILED DESCRIPTION

Embodiments provide systems and methods for manufacturing a golf ball having strong inter-layer bonding and desired structural characteristics, provided by including temporary, removable particles in a golf ball substrate and then removing the particles to form voids in the substrate, including the outer surface and interior of the substrate. An outer layer adjacent to the substrate may then be formed over the substrate, with material of the outer layer occupying the voids in the outer surface and providing a strong inter-layer bond. The voids provide the strong bond, for example, by increasing the surface area over which the layers contact each other, and by providing interconnecting mechanical structures. Substrates with voids may be formed between one or more inter-layer boundaries of a multilayer golf ball.

As used herein the term "substrate" refers to a portion of a structure underlying another portion of the structure. For example, in a golf ball, a substrate may be any portion under the outermost layer or cover, such as an intermediate layer or a core.

In embodiments, the uneven surface of the substrate provided by the voids results in a strong inter-layer bond that may resist delamination, improve durability, and enhance spin and carrying characteristics, especially when applied to the outermost interface between a cover and a substrate underlying the cover. The inter-layer bond may resist delamination, even upon repeated impacts to the cover, and may inhibit tears, degradation, and other damage to the cover. Golf balls having the uneven inter-layer boundaries may thus benefit from improved durability and playing characteristics.

In addition, golf balls having uneven inter-layer boundaries may exhibit improved carrying characteristics. The increased bond and tight contact between an outer cover and underlying substrate may, for example, improve the consistency and feel of a golf ball, enabling a player to better control the spin and carry of the ball. In other words, the ball may react consistently to the application of force to the ball by a player, for example, allowing the player to hit the ball a certain way to achieve a certain, predictable response. For example, a high spinning characteristic may be obtained when the ball is hit by a club requiring a higher spin, whereas a low spinning characteristic may be obtained when the ball is hit by a club requiring a lower spin and a larger carrying distance.

Figure 1:
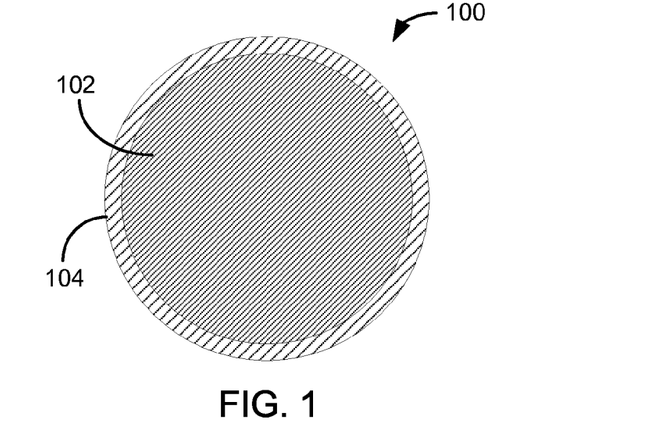
FIG. 1 is a schematic diagram illustrating an embodiment of a two-piece golf ball having a core and a cover disposed around the core.

Embodiments may provide manufacturing methods and systems applicable to any multilayer golf ball, including wound golf balls and solid golf balls. For example, FIG. 1 illustrates a two-piece golf ball 100 having a core 102 and a cover 104 disposed around core 102, with the core 102 comprising the substrate underlying cover 104. Voids may be formed in the outer surface of core 102, as discussed in more detail below. Material of the cover 104 may occupy the voids. Cover 104 and core 102 may be formed from different materials or different formulations (e.g., ratios) of the same materials.

Figure 2:
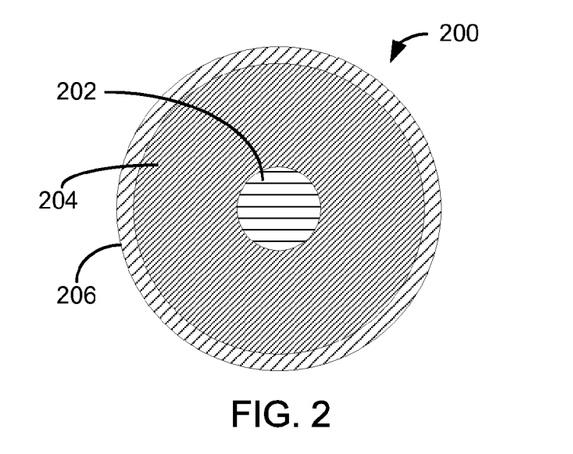
FIG. 2 is a schematic diagram illustrating an embodiment of a three-piece golf ball having a core, one intermediate layer, and a cover.

As another example, FIG. 2 illustrates a three-piece golf ball 200 having a core 202, one intermediate layer 204, and a cover 206. As shown, core 202 may be surrounded by intermediate layer 204, and cover 206 may be disposed around intermediate layer 204. Core 202, intermediate layer 204, and cover 206 may each be formed from different materials. Alternatively, core 202 and intermediate layer 204 may both be made from the same materials, but from different formulations (e.g., ratios) of those materials. In FIG. 2, voids may be formed in the outer surfaces of at least one of core 202 and intermediate layer 204. Material of an adjacent upper layer may occupy the voids. For example, if voids are provided in core 202, material of intermediate layer 204 may occupy those voids. If voids are provided in intermediate layer 204, material of cover 206 may occupy those voids. In embodiments, core 202 may be solid, hollow, or fluid-filled.

Figure 3:
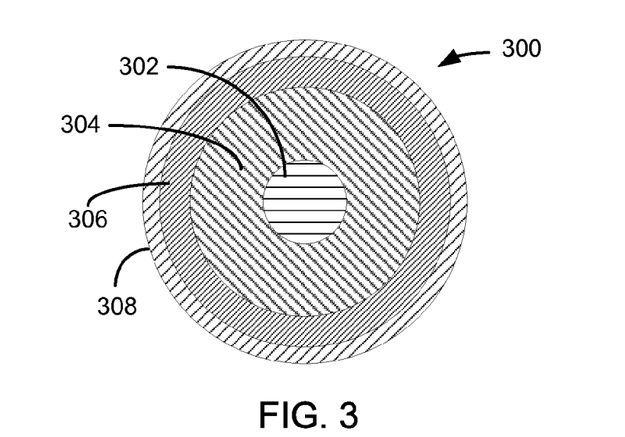
FIG. 3 is a schematic diagram illustrating an embodiment of a four-piece golf ball having a core, two intermediate layers, and a cover.

As another example, FIG. 3 illustrates a four-piece golf ball 300 having a core 302, a first intermediate layer 304, a second intermediate layer 306, and a cover 308. Core 302 may be solid, hollow, or fluid-filled, and may be surrounded by first intermediate layer 304. Second intermediate layer 306 may be disposed around the first intermediate layer 304. An outer surface of at least one of core 302, first intermediate layer 304, and second intermediate layer 306 may be formed with voids, and material of an adjacent upper layer may occupy those voids. For example, if voids are provided in core 302, material of first intermediate layer 304 may occupy those voids. If voids are provided in first intermediate layer 304, material of second intermediate layer 306 may occupy those voids. And, if voids are provided in second intermediate layer 306, material of cover 308 may occupy those voids.

Although the examples of FIGS. 1-3 illustrate two-piece, three-piece, and four-piece constructions, embodiments disclosed herein may be applied to multilayer golf balls having any number of layers, including five or more.

As used herein, the term "outer surface" in relation to a described layer refers to the surface of that layer at the interface between that substrate layer and an adjacent layer that is disposed outwardly with respect to the substrate layer. For example, referring to FIG. 3, the outer surface of the core 302 is between the core 302 and the first intermediate layer 304, and the outer surface of the first intermediate layer 304 is between the first intermediate layer 304 and the second intermediate layer 306, and the outer surface of the second intermediate layer 306 is between the second intermediate layer 306 and the cover 308. In an embodiment, if a core is not solid, first intermediate layer 304 may include a layer, such as a flexible enclosure, surrounding and containing the gas or fluid of the core.

Figure 4:
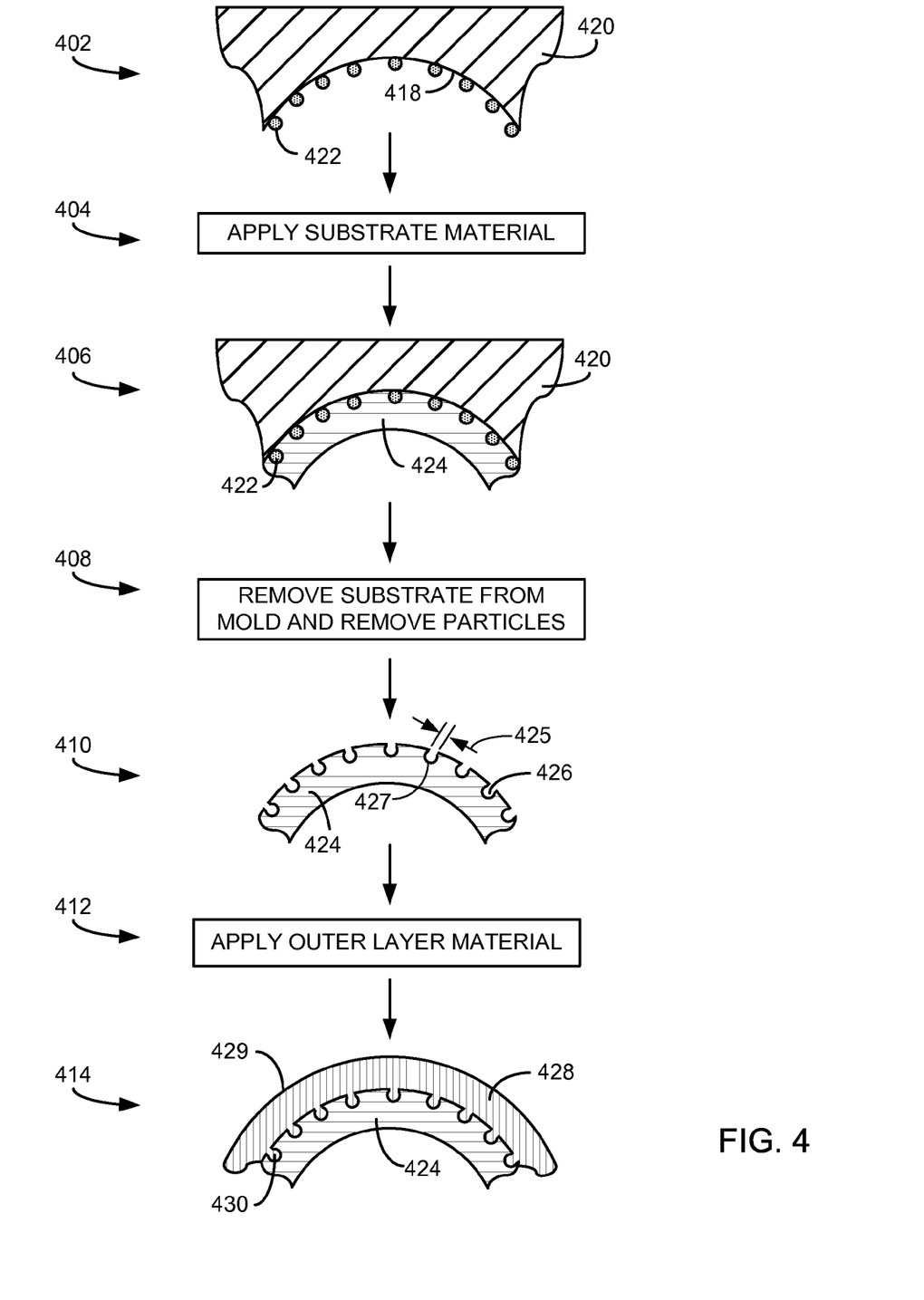
FIG. 4 is a schematic diagram and flowchart illustrating an embodiment of a method and system for manufacturing a golf ball having a substrate with voids, using removable small particles applied to a mold.

FIG. 4 illustrates an embodiment of a method and system for manufacturing a golf ball having a substrate with voids, to provide a strong inter-layer bond. As shown, in step 402, a mold 420 may be provided, which corresponds to a desired size and shape of a substrate of a golf ball, as defined by an inner molding surface 418 of the mold 420. Although, for clarity, FIG. 4 depicts mold 420 in a partial cross-sectional slice view, mold 420 may enclose a three-dimensional volume in which a golf ball substrate may be formed. For example, mold 420 may include two parts, each defining a hemispherical volume for a golf ball substrate. A substrate layer may be formed within the mold 420 as a spherical structure. Alternatively, mold 420 may be configured to receive a pre-manufactured portion of the golf ball over which a substrate is to be formed. The pre-manufactured portion may be, for example, a core (e.g., core 202 of FIG. 2 or core 302 of FIG. 3) or a multilayer golf ball portion (e.g., core 302 and first intermediate layer 304 of FIG. 3). Mold 420 may include one or more mold pins to hold the pre-manufactured portion in position while the substrate is formed around the pre-manufactured portion.

As shown in step 402, removable particles 422 may be applied to the molding surface 418 of the mold 420. Molding surface 418 may define the outer surface of the substrate. Particles 422 may be uniformly applied in a specific pattern or distribution. Alternatively, particles 422 may be applied randomly. Although, for clarity, FIG. 4 shows particles 422 of a large size relative to the shape of the substrate, particles 422 may be of any size suitable for providing a desired correspondingly sized void and resulting bond. In addition, although, again for clarity, FIG. 4 shows particles 422 as circular in cross-sectional shape, particles 422 may be any desired regular or irregular shape. For example, particles 422 may be spherical, hemispherical, cylindrical, polygonal, grain-shaped, or fiber-shaped.

Particles 422 may be applied to molding surface 418 of mold 420 by any suitable method, including, for example, by spraying, by pipetting, or by brushing onto the surface. One embodiment provides a dispensing head having a shape (e.g., hemispherical) complementary to the shape of the molding surface 418 of the mold 420, with outlets in the dispensing head positioned at locations at which particles are desired. The dispensing head may be brought into proximity to the molding surface 418, whereupon particles may be deposited from the outlets onto the molding surface 418. In another embodiment, particles 422 may be suspended in a wash solution that is applied to the molding surface 418, and then evaporated (e.g., by heating) so that the particles 422 settle onto and adhere to the molding surface 418. In another embodiment, particles 422 may be salt particles that are applied to the molding surface 418 and heated to sinter the salt particles, which may form a connected network of particles.

After applying removable particles 422 to the molding surface 418, in step 404, a substrate material may be applied to the mold 420, onto the particles 422 and molding surface 418. The substrate material may contact the molding surface 418 and surround the particles 422 except for portions of the particles 422 in contact with the molding surface 418. The substrate material may form a solid core or may form a layer over another portion of the golf ball, such as an intermediate layer or a core. In the example of FIG. 4, the substrate material forms a substrate 424 that is a layer over another portion of the golf ball (not shown for clarity).

In one embodiment, the substrate material may be injected into mold 420 in liquid form, and then allowed to cool and solidify. Substrate material may be, for example, an elastomer or a thermoplastic material. A suitable elastomer may be, for example, a cross-linked rubber such as polybutadiene, which may be chemically cross-linked with zinc diacrylate and/or similar cross-linking agents. A suitable thermoplastic material may be, for example, a thermoplastic polyurethane or an ionomer resin, such as the highly neutralized ionomer resins developed by E. I. DuPont de Nemours of Wilmington, Del.

In one embodiment in which the particles 422 are sintered together or are otherwise in contact, molten substrate material may penetrate gaps between the particles.

After forming substrate 424, as shown in step 408 of FIG. 4, the substrate 424 and any underlying portions of the golf ball may be removed from the mold 420. At this point, removable particles 422 are held within the matrix of the substrate material, with portions of the particles 422 exposed at the outer surface of the substrate 424. By virtue of this exposure, particles 422 may then be removed from the substrate 424. Particles 422 may be removed, for example, by physically extracting the particles (e.g., by brushing or air blasting), by dissolving and washing away the particles, or by melting or evaporating the particles.

Physically extracting the particles 422 may involve physically contacting and dislodging the particles 422. For example, particles 422 may be brushed or sanded off of substrate 424. Alternatively, a forced current of air (e.g., air blasting) may be applied to the substrate 424 to dislodge and expel particles 422. In another embodiment, the substrate 424, along with any underlying portions of the golf ball, may be tumbled to dislodge and expel the particles 422.

Dissolving removable particles 422 may involve using particles 422 made of a soluble material that dissolves upon application of a corresponding solvent. For example, particles 422 may be made of a water-soluble material, such that application of water to the substrate 424 may dissolve and wash away the particles 422. Preferably, the solvent dissolves the particles without affecting the substrate material. In other words, the substrate material may be substantially insoluble in a solvent that readily solubilizes the material of the particles.

In one embodiment, particles 422 may be salt crystals (e.g., sodium chloride crystals). In this manner, the salt crystals may be applied to the mold 420 by being partially dissolved and then distributed over the mold surface 418, for example, by dusting or spraying. The partially dissolved salt crystals may thereby adhere to the molding surface 418 and remain in place as the substrate material is applied. In one embodiment, a layer of fluid or solvent is applied to the mold surface 418, the salt crystals are then applied and allowed to partially dissolve and adhere, and the fluid or solvent is then removed (e.g., by evaporation) without disturbing the salt crystals. After forming the substrate layer with the salt crystals embedded therein, water or another appropriate solvent may be applied to the substrate layer to completely dissolve and wash away the salt crystals. Alternatively, the salt crystals may also be removed by lightly brushing the outer surface of the substrate layer.

In another embodiment, particles 422 may be polystyrene particles, which may be dissolved and washed away by applying styrene.

In another embodiment, particles 422 may be polyvinyl alcohol resin filaments, water-soluble polysaccharide, or water-soluble cellulose, each of which may be dissolved and washed away by applying water.

In another embodiment, particles 422 may be fibers made of nylon, polyethylene terephthalate, or acetate. In the case of nylon or polyethylene terephthalate particles, acetic acid may be applied to dissolve and wash away the particles. In the case of acetate particles, acetone or methyl ethyl ketone may be applied to dissolve and wash away the particles.

To remove particles 422 by melting or evaporation, embodiments may provide suitable materials as between the substrate 424 and the particles 422. In one embodiment, particles 422 may be made of material having a melting point lower than the melting point of the material of the substrate 424, such that application of heat causes the particles 422 to melt and either flow out or evaporate, without affecting the substrate 424. In this example, the substrate 424 may be applied to mold 420 using a method that does not require heating the substrate material above the melting point of the particles 422. Particles 422 may be a gel, for example. In other embodiments, particles 422 may be fluid-filled microcapsules, gas-filled microcapsules, or gel microbeads, which may be removed by heating the removable particles.

In another embodiment, microwave irradiation may be used to selectively heat the particles 422, and not heat the substrate 424. Different material compounds convert microwave irradiation to heat by different amounts. Particles 422 may therefore be made of a material that converts microwave radiation to heat in amounts greater than that of the substrate material. This selectivity may enable the particles 422 to heat, melt, and either flow out or evaporate, all without affecting the substrate 424.

After the particles 422 are removed, substrate 424 may define voids 426 as shown in step 410. The voids 426 may have substantially the same size and shape as the particles 422 that formerly occupied those locations. Preferably, to enhance the mechanical connection between layers, voids 426 may be shaped such that their openings are smaller than a dimension beneath the opening. For example, a void 426 may be dovetail-shaped or, as shown in FIG. 4, shaped with a wide circular base 427 and narrower upper opening 425. In this manner, as described in more detail below, structures formed within the voids 426 may be mechanically held within the voids because the larger-sized portions inside the voids 426 may not pass through the narrower openings.

Voids 426 may also form continuous pores, for example, when the voids are formed by salt sintered to the mold in a network of crystals. The continuous pores may provide a desirable structure into which the material of an outer layer can penetrate and thereby create a strong bond.

With the substrate 424 defining voids 426, a material may then be applied to the substrate 424 to form an outer layer, as shown in step 412 of FIG. 4. Forming the outer layer may involve applying the outer layer material by, for example, spraying or brushing. In one embodiment, outer layer may be formed by molding the outer layer material onto the substrate 424. For example, substrate 424 and any underlying portions of the golf ball may be placed in a mold, and the outer layer material may be injected in liquid form between the mold and the substrate 424. In applying the outer layer material, the material may flow or be otherwise deposited within the voids 426, and may be continuous above the outer surface of the substrate 424 above and between the voids 426.

After applying the outer layer material, an outer layer 428 may be formed over substrate 424 as shown in step 414 of FIG. 4. The outer layer 428 may be a monolithic structure that is integral between the voids 426 that it occupies and its outer surface 429. The protruding portions 430 of the outer layer 428 that occupy the voids 426 may provide a strong mechanical connection between the outer layer 428 and the substrate 424.

Outer layer 428 may be a cover of a golf ball (e.g., covers 104, 206, and 308 of FIGS. 1, 2, and 3, respectively), which may have dimples (not shown for clarity). The dimples may be formed by a mold in which the outer layer material may be injected in liquid form. In this embodiment, the strong inter-layer bond provided by the voids 426 and protruding portions 430 may resist delamination, improve durability, and enhance spin and carrying characteristics, as described above. An outer layer 428 forming a cover of a golf ball may be formed from a material such as SURLYN® as produced by E. I. DuPont de Nemours of Wilmington, Del.

In another embodiment, outer layer 428 may be an intermediate layer such as intermediate layer 204 of FIG. 2 or intermediate layers 304 and 306 of FIG. 3. In this case, outer layer 428 may be formed with a smooth outer surface 429. Alternatively, in another embodiment, the outer surface 429 of the outer layer 428 may be formed with voids by disposing removable particles at the outer surface and subsequently removing those particles, as was done for the substrate 424. Providing these voids at the outer surface 429 of the outer layer 428 enables a second outer layer to bond with the outer layer 428 in the same manner that the outer layer 428 bonds to the substrate 424. Thus, the strong inter-layer bonds may be provided at the interface between each layer of a multilayer golf ball. This strong inter-layer bonding throughout a multilayer golf ball further enhances delamination resistance, durability, and spin and carrying characteristics.

Figure 51:
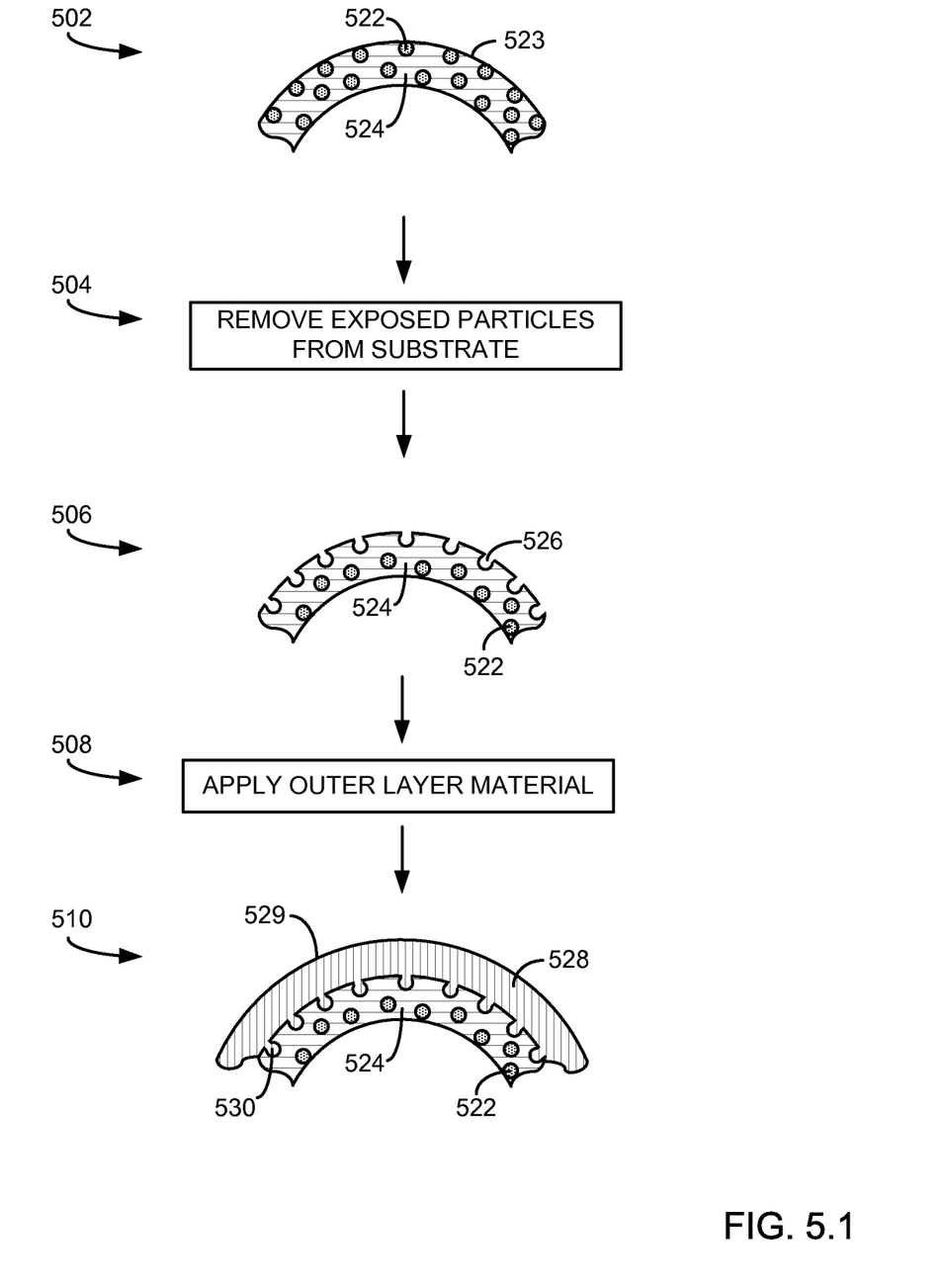

FIG. 5.1 illustrates another embodiment of a method and system for manufacturing a golf ball having a substrate with voids, to provide a strong inter-layer bond. In this embodiment, particles may be dispersed throughout a substrate, with particles at the outer surface of the substrate being removable. As shown in step 502 of FIG. 5.1, a substrate 524 may be formed. Substrate 524 may be a core of a golf ball, or, as is shown in FIG. 5.1, may be an intermediate layer of a golf ball. Substrate 524 may be formed by any suitable means, as described above in reference to FIG. 4. For example, substrate 524 may be formed by injection molding, spraying, or brushing.

In forming substrate 524, the substrate material applied to form the substrate 524 may include a matrix material and particles 522 suspended in the matrix material. The substrate material, composed of the matrix material and particles 522, may be injected in liquid form in a mold and then allowed to cool and solidify. Once formed, the substrate 524 may be solid throughout, with the particles 522 dispersed in the matrix material, as shown in FIG. 5.1. This distribution of the particles 522 places some of the particles 522 within the matrix, fully encased by the matrix. Other particles 522 may be disposed at the outer surface 523 of the substrate 524, with portions of those particles 522 exposed. These exposed particles may be removable particles.

After the substrate 524 is formed, as shown in step 504 of FIG. 5.1, the exposed particles 522 may be removed from the substrate 524, as described above in reference to FIG. 4. In addition to using particles that are suitable for removal when disposed at the outer surface 523, in this embodiment, the particles 522 may also be suitable for providing necessary structural support to the substrate 524 when disposed within the matrix material and not removed. In other words, a material of the particles 522 may preferably be conducive to removal by a desired means (e.g., dissolving by a solvent), while also being conducive to providing structural support to the substrate 524, or at least not compromising the structural support provided by the matrix portion of the substrate 524. For example, particles may be made of a relatively hard material that is soluble in a solvent.

After removing the exposed particles 522 from substrate 524, voids 526 may be defined by substrate 524 as shown in step 506 of FIG. 5.1. The non-exposed particles 522 may remain encased within the matrix material of the substrate 524, as shown.

Having formed the substrate 524 with voids 526, in step 508 of FIG. 5.1, an outer layer material may then be applied, as described above in reference to FIG. 4. The outer layer material may be injected or otherwise deposited in the voids 526 and around the substrate 524 to form outer layer 528, as shown in step 510 of FIG. 5.1. The outer layer 528 may include protrusion portions 530 that occupy the voids 526 and provide a strong inter-layer bond, as described above. In addition, the non-exposed particles 522 remain encased within the substrate 524 as a permanent part of the golf ball.

As with the embodiment of FIG. 4, the outer layer 528 of the embodiment of FIG. 5.1 may be a cover or an intermediate layer, and may be formed with dimples or with voids in a manner similar to the formation of the voids 526 in the substrate 524. In this respect, the outer layer material may include a matrix material and particles suspended in the matrix, some of which may be exposed at the outer surface 529 and others of which may be encased within the matrix and not exposed. With voids defined in the outer surface 529 of the outer layer

528, a multilayer golf ball may benefit from strong inter-layer bonds at more than one interface between the layers, as described above.

A further aspect of a system and method for manufacturing a golf ball includes provisions for controlling structural characteristics of a substrate using voids within the substrate. Thus, in addition to, or instead of, forming voids at an outer surface of a substrate, this further aspect may form voids within the interior, or thickness, of the substrate. The voids may be sized, shaped, distributed, or otherwise configured to provide desired structural characteristics of the substrate, for example, in terms of compression, feel, and spin. The voids may, for example, provide a cell-like structure that yields, in comparison to a solid structure, in some embodiments a softer compression, a softer feel, and altered spin rates, either higher or lower.

Figure 52:
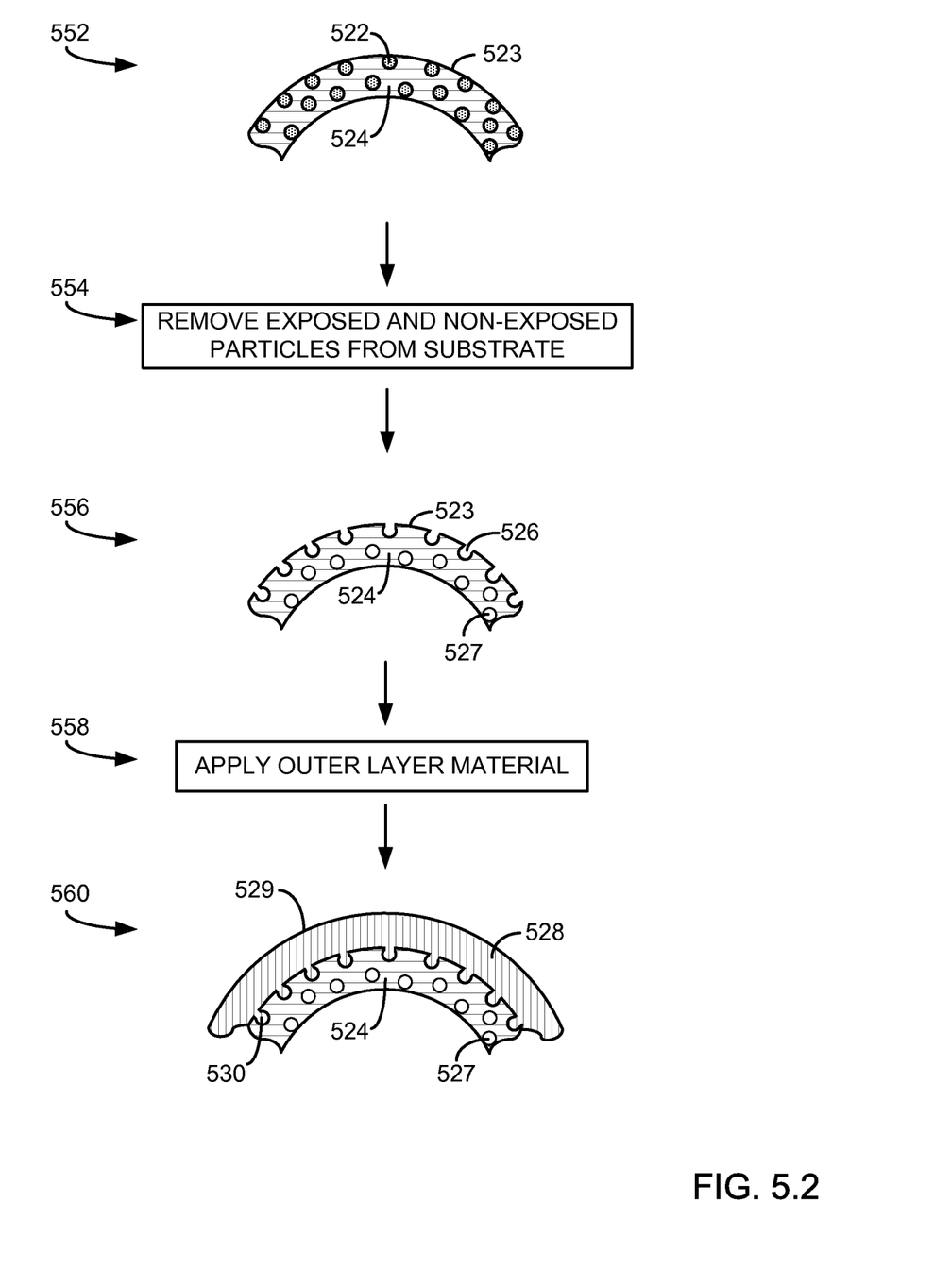

FIG. 5.2 illustrates an embodiment of a method and system for manufacturing a golf ball having a substrate with voids at the outer surface of the substrate and within the substrate, to provide a strong inter-layer bond and desired structural characteristics of the substrate layer. In this embodiment, particles may be dispersed throughout a substrate, with particles at the outer surface of the substrate and within the substrate, being removable. As shown in step 552 of FIG. 5.2, a substrate 524 may be formed. Substrate 524 may be a core of a golf ball, or, as is shown in FIG. 5.2, may be an intermediate layer of a golf ball. Substrate 524 may be formed by any suitable means, as described above in reference to FIG. 4. For example, substrate 524 may be formed by injection molding, spraying, or brushing.

In forming substrate 524, the substrate material applied to form the substrate 524 may include a matrix material and particles 522 suspended in the matrix material. The substrate material, composed of the matrix material and particles 522, may be injected in liquid form in a mold and then allowed to cool and solidify. Once formed, the substrate 524 may be solid throughout, with the particles 522 dispersed in the matrix material, as shown in FIG. 5.2. This distribution of the particles 522 may place some of the particles 522 encased within the matrix, and other particles 522 disposed at the outer surface 523 of the substrate 524, with portions of those outer particles 522 exposed. In this embodiment, both encased particles and also exposed outer particles may be removable particles.

After the substrate 524 is formed, as shown in step 554 of FIG. 5.2, both exposed and non-exposed particles 522 may be removed from the substrate 524, using the techniques described above in reference to FIG. 4 that are also capable of removing the encased non-exposed particles 522 within the substrate 524. For example, one embodiment mixes rough grains of salt crystal into a rubber compound to form the substrate, and then treats the cured rubber substrate by exposing the substrate to hot water. The hot water may melt the salt crystals not only at the surface where some crystals may be exposed, but also within the rubber substrate where other crystals may be encased (e.g., at a depth of a few millimeters).

In removing encased removable particles, another embodiment mixes thermoplastic synthetic resin powder with water-soluble salt powder having a particle size larger than the resin powder, forming the mixture into the substrate, and then dissolving and removing the salt powder from the mixture. The mixture may be formed into the substrate by placing the mixture in a mold, applying heat and pressure to the mixture against the mold, and then cooling the formed mixture. Water may then be applied to the formed substrate to dissolve and remove the water-soluble powder particles from the substrate, thereby providing a porous substrate structure. Suitable techniques for forming voids within a substrate are disclosed in U.S. Pat. No. 4,705,809 to Dighton et al. and in Japanese publications numbers JP55090361 and JP61185538, all of which are herein incorporated by reference in their entirety.

In addition to using particles that are suitable for removal when disposed at the outer surface 523 or within substrate 524, in embodiments, the particles 522 may also be suitable for providing necessary structural support to the substrate 524 when they are not removed from the substrate 524 and remain encased within the matrix material. In some embodiments, for example, soluble particles disposed deep within a substrate may not be exposed to the solvent and may therefore not be eluted and may remain intact. To account for those particles that remain within the substrate, a material of the particles 522 may preferably be conducive to removal by a desired means (e.g., dissolving by a solvent), while also being conducive to providing structural support to the substrate 524, or at least not compromising the structural support provided by the matrix portion of the substrate 524. For example, particles may be made of a relatively hard material that is soluble in a solvent.

After removing exposed and non-exposed particles 522 from substrate 524, open voids 526 and closed voids 527 may be defined by substrate 524 as shown in step 556 of FIG. 5.2. The open voids 526 at the outer surface 523 of the substrate 524 may provide bonding characteristics as described above. Closed voids 527 may provide a cell-like, or sponge-like, construction that yields desired compression characteristics, for example. Although not shown in FIG. 5.2, other non-exposed particles 522 may remain encased within the matrix material of the substrate 524, for example, if the particles are soluble particles and the solvent does not reach all of the particles.

Having formed the substrate 524 with voids 526 and 527, in step 558 of FIG. 5.2, an outer layer material may then be applied, as described above in reference to FIG. 4. The outer layer material may be injected or otherwise deposited in the voids 526 and around the substrate 524 to form outer layer 528, as shown in step 560 of FIG. 5.2. The outer layer 528 may include protrusion portions 530 that occupy the voids 526 and provide a strong inter-layer bond, as described above. In addition, closed voids 527 remain within the substrate 524 to provide desired structural characteristics. Other non-exposed and non-removed particles (not shown) may remain encased within the substrate 524 as a permanent part of the golf ball.

As with the embodiment of FIG. 4, the outer layer 528 of the embodiment of FIG. 5.2 may be a cover or an intermediate layer, and may be formed with dimples or with voids in a manner similar to formation of the voids 526 and 527 in the substrate 524. In this respect, the outer layer material may include a matrix material and particles suspended in the matrix, some of which may be exposed at the outer surface 529 and then removed, and others of which may be encased within the matrix and then either removed or not removed. With voids defined in the outer surface 529 of the outer layer 528, a multilayer golf ball may benefit from strong inter-layer bonds at more than one interface between the layers, as described above.

The closed voids 527 within a substrate 524 may provide surprising benefits in attaining desired structural characteristics related to, for example, compression, feel, and spin. Designers may control such structural characteristics by selecting appropriate sizes, quantities, and distributions of the particles that form the closed cells within a substrate. For example, greater numbers of larger particles may provide a softer, more compressible structure.

Figure 6:
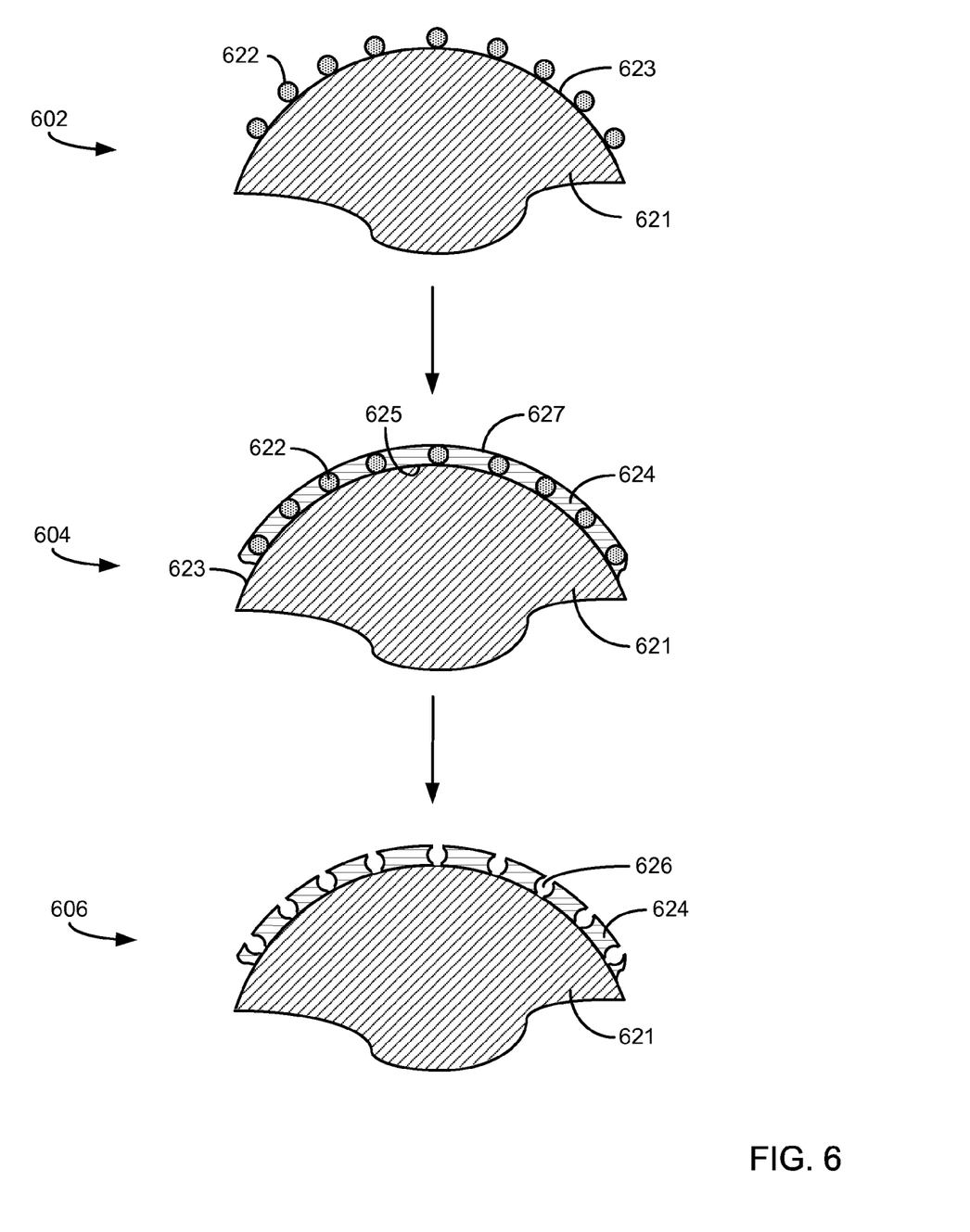
FIG. 6 is a schematic diagram and flowchart illustrating an embodiment of a method and system for manufacturing a golf ball having a substrate with voids, using removable small particles applied to a pre-formed golf portion.

FIG. 6 illustrates another embodiment of a system and method for manufacturing a golf ball having a substrate with voids. In this embodiment, removable particles may be sized to extend from an inner surface of the substrate to an outer surface of the substrate. With this relative sizing, this embodiment may enable the option of either applying the removable particles to a mold or to an already formed golf ball portion. As an example, step 602 of FIG. 6 illustrates removable particles 622 applied to an already formed golf ball portion, which in this case is a golf ball core 621 (shown in a partial view for clarity). Removable particles 622 may be applied by any of the various techniques described above, for example, by dusting particles 622 over the outer surface 623 of core 621. Particles 622 may be uniformly or randomly distributed over the outer surface 623.

After removable particles 622 are in place, substrate 624 may be formed over the particles 622 and the outer surface 623 of core 621 as shown in step 604 of FIG. 6 (in partial view for clarity). The thickness of substrate 624 may be limited so that the particles 622 extend from the inner surface 625 of the substrate 624 (and the outer surface 623 of core 621) to the outer surface 627 of substrate 624. Removable particles 622 may therefore be exposed at the outer surface 627 of substrate 624.

Using any of the techniques described above, removable particles 622 may then be removed from substrate 624 to yield voids 626 defined by the substrate 624, as shown in the example of step 604 of FIG. 6. The structure of step 606 may then be further processed as described above to form an outer layer having protruding portions that occupy the voids 626.

Overall, embodiments of the improved methods and golf balls may be provided by treating at least a portion of an outer surface of at least one of a golf ball center and an intermediate layer, such as the outermost intermediate layer that forms an interface between the core and the cover layer. The treatment may be sufficient to reduce or avoid the use of adhesives at the interface between the treated layer and the outer layer disposed thereabout.

In one embodiment, during a golf ball manufacturing process, a substrate may be formed as a core or as a layer on already formed golf ball portion, such as a golf ball core. The material of the substrate may include a permanent matrix and impermanent small particles embedded in the matrix. The embedding of the small particles may occur during a molding process, for example, by lining a mold cavity with the small particles and injecting the matrix. Other methods of embedding the particles are also contemplated.

After the matrix has cured, the small particles may be removed from the matrix. Removal of the small particles may be accomplished by exposure to water or other solvent that dissolves the particles but does not affect the cured matrix material. The particles may also be removed by other means, such as by brushing or tumbling. The small particles may be particularly positioned in the substrate or randomly positioned in the coating.

Providing the substrate treatment affords surprising benefits for a golf ball. The embedded small particles may create uneven interfaces between the layers of a golf ball, which increase the surface area over which the layers contact each other and provide surface roughness or other mechanical interconnections between the layers. The increased surface contact and interconnections increase adherence of an outer layer to a substrate to provide a more cohesive golf ball structure that may be more durable and may respond more predictably to a golf player's application of force. In addition, when the particles are fully encased in a layer and are then removed to create closed voids, those closed voids may provide the layer with desired structural characteristics, for example, in terms of compression.

A further embodiment applies removable particles to an outermost layer of a golf ball, such as the cover layer. Using, for example, either of the techniques disclosed in reference to FIGS. 4 and 5, voids may be formed in a cover layer. These voids may define dimples or other desired surface features of a golf ball. In one embodiment, the particles may be shaped as a hemisphere or a smaller end sliver of a sphere, and may be placed with their flat sides against a mold surface, in a uniform distribution corresponding to a desired dimple pattern. After forming the cover layer around the particles, the particles may be removed to obtain the desired surface features (e.g., dimple pattern) of the cover layer. The textured cover layer may provide the finished appearance of the golf ball, or an additional layer (e.g., a layer of paint or clear coating) may be applied to the textured cover layer to finish the golf ball.

It will be appreciated by those in the art that this method of manufacturing is not limited to golf balls, but may be successfully used in the manufacture of any layered article.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to a method and/or process should not be limited to the performance of their steps in the order written, and one skilled in the art can readily appreciate that the sequences may be varied and still remain within the spirit and scope of the present invention.

What is claimed is:

1. A method for manufacturing a golf ball comprising:
   forming a substrate of the golf ball, the substrate having an outer surface;
   disposing removable substrate particles at the outer surface of the substrate such that at least a portion of each of the removable substrate particles is exposed at the outer surface of the substrate;
   wherein forming the substrate and disposing the removable substrate particles at the outer surface of the substrate comprises:
      mixing particles with a substrate material to form a mixture;
      injecting the mixture into a mold with the particles suspended throughout the mixture, wherein a first plurality of the particles is disposed against the mold and comprises the removable substrate particles, and wherein a second plurality of the particles is encased within the substrate and comprises non-exposed removable substrate particles; and
      solidifying the mixture to form the substrate, with the removable substrate particles exposed at the outer surface of the substrate;

removing the removable substrate particles from the outer surface of the substrate to form voids in the outer surface of the substrate;

leaving the non-exposed removable substrate particles encased within the substrate to provide the substrate with structural support that is at least equal to the structural support provided by the substrate material, wherein the non-exposed removable substrate particles are made of material capable of withstanding impact by a golf club;

applying dimple-shaped removable particles to a cover mold, wherein each dimple-shaped removable particle has a substantially flat side and a spherical side, wherein the dimple-shaped removable particles are applied with their flat sides against the cover mold in a uniform distribution corresponding to a desired dimple pattern;

injecting a cover material in liquid form into the cover mold, over the dimple-shaped removable particles, and into the voids of the substrate;

solidifying the liquid cover material to form a cover of the golf ball, with the dimple-shaped removable particles embedded in the cover with the flat sides of the dimple-shaped removable particles exposed at the outer surface of the cover;

removing the golf ball from the cover mold with the dimple-shaped removable particles embedded in the cover of the golf ball; and removing the dimple-shaped removable particles from the outer surface of the cover to form the desired dimple pattern in the cover of the golf ball.

2. The method of claim 1, wherein the removable substrate particles comprise soluble material, wherein removing the removable substrate particles comprises applying a solvent to the substrate, and wherein the solvent comprises a substance that dissolves the soluble material.

3. The method of claim 2, wherein the removable substrate particles comprise water-soluble particles, and the solvent comprises water.

4. The method of claim 1, wherein before mixing the particles with the substrate material to form the mixture, the method further comprises selecting a material for the particles that is both conducive to removal by a desired removal means and is conducive to providing the structural support to the substrate.

5. The method of claim 4, wherein the desired removal means comprises dissolving by a solvent.

6. The method of claim 1, wherein removing the removable substrate particles from the outer surface of the substrate and leaving the non-exposed removable substrate particles encased within the substrate comprise applying a solvent to the outer surface of the substrate such that the solvent dissolves the removable substrate particles at the outer surface of the substrate but does not reach the non-exposed removable substrate particles encased within the substrate to leave the non-exposed removable substrate particles intact.

7. The method of claim 1, wherein the particles mixed with the substrate to form the mixture comprise soluble particles dissolvable in a solvent, and wherein removing the removable substrate particles from the outer surface of the substrate comprises applying the solvent to the substrate.

8. The method of claim 1, wherein applying the dimple-shaped removable particles comprises applying the dimple-shaped removable particles to a concave spherical surface of the cover mold by dispensing the dimple-shaped removable particles through a dispensing head having a shape complementary to the concave spherical surface of the cover mold, wherein the dimple-shaped removable particles are dispensed through outlets of the dispensing head positioned at locations at which the dimple-shaped removable particles are desired on the concave spherical surface of the cover mold.

9. The method of claim 1, wherein the substrate comprises one of an intermediate layer and a core of the golf ball.

10. The method of claim 1, wherein the substrate comprises a first substrate layer, and
wherein the method further comprises forming a second substrate layer under the first substrate layer such that material of the first substrate layer occupies voids in an outer surface of the second substrate layer.

11. The method of claim 10, wherein the voids in the outer surface of the second substrate layer are formed by:
applying second removable substrate particles to a surface of a second mold;
injecting second substrate layer material in liquid form into the second mold over the second removable particles; and
solidifying the liquid second substrate layer material with the second removable particles embedded in the second substrate layer material.

12. The method of claim 1, wherein removing the removable substrate particles comprises one of physically contacting the removable substrate particles with force and pneumatically contacting the removable substrate particles with air.

13. The method of claim 1, wherein the removable substrate particles comprise one of fluid-filled microcapsules, gas-filled microcapsules, and gel microbeads, and wherein removing the removable substrate particles comprises heating the removable substrate particles.

14. The method of claim 1, wherein removing the removable substrate particles comprises selectively heating the removable substrate particles without appreciably heating the substrate.

15. A method for manufacturing golf ball comprising:
forming a substrate of the golf ball, the substrate having an outer surface;
disposing removable substrate particles at the outer surface of the substrate such that at least a portion of each of the removable substrate particles is exposed at the outer surface of the substrate;
wherein forming the substrate and disposing the removable substrate particles at the outer surface of the substrate comprises:
mixing particles with a substrate material to form a mixture;
injecting the mixture into a mold with the particles suspended throughout the mixture, wherein a first plurality of the particles is disposed against the mold and comprises the removable substrate particles, and wherein a second plurality of the particles is encased within the substrate and comprises non-exposed removable substrate particles; and
solidifying the mixture to form the substrate, with the removable substrate particles exposed at the outer surface of the substrate;
removing the removable substrate particles from the outer surface of the substrate to form voids in the outer surface of the substrate;
leaving the non-exposed removable substrate particles encased within the substrate to provide the substrate with structural support that is at least equal to the structural support provided by the substrate material, wherein the non-exposed removable substrate particles are made of material capable of withstanding impact by a golf club;

applying dimple-shaped removable particles to a cover mold, wherein each dimple-shaped removable particle has a substantially flat side and a spherical side, wherein the dimple-shaped removable particles are applied with their flat sides against the cover mold in a uniform distribution corresponding to a desired dimple pattern;

injecting a cover material in liquid form into the cover mold, over the dimple-shaped removable particles, and into the voids of the substrate;

solidifying the liquid cover material to form a cover of the golf ball, with the dimple-shaped removable particles embedded in the cover with the flat sides of the dimple-shaped removable particles exposed at the outer surface of the cover; and removing the golf ball from the cover mold with the dimple-shaped removable particles embedded in the cover of the golf ball, wherein the dimple-shaped removable particles are removable from the outer surface of the cover to form the desired dimple pattern in the cover of the golf ball.

16. The method of claim 15, wherein each void has an opening at the outer surface of the substrate that is narrower than an interior dimension of the each void.

17. A method for manufacturing a golf ball comprising:

applying removable particles to a mold, wherein each removable particle has a substantially flat side and a spherical side, wherein the removable particles are applied with their flat sides against the mold in a uniform distribution corresponding to a desired dimple pattern;

injecting a cover material in liquid form into the mold and over the removable particles;

solidifying the liquid cover material to form a cover of the golf ball, with the removable particles embedded in the cover with the flat sides of the removable particles exposed at the outer surface of the cover;

removing the golf ball from the mold with the removable particles embedded in the cover of the golf ball; and removing the removable particles from the outer surface of the cover to form the desired dimple pattern in the cover of the golf ball.

18. The method of claim 17, wherein applying the removable particles comprises applying the removable particles to a concave spherical surface of the mold by dispensing the removable particles through a dispensing head having a shape complementary to the concave spherical surface of the mold, wherein the removable particles are dispensed through outlets of the dispensing head positioned at locations at which the removable particles are desired on the concave spherical surface of the mold.

19. The method of claim 18, wherein the complementary shape is a convex hemispherical shape.

20. The method of claim 17, wherein the removable particles comprise soluble material, wherein removing the removable particles comprises applying a solvent to the outer surface of the cover, and wherein the solvent comprises a substance that dissolves the soluble material.

21. The method of claim 20, wherein the removable particles comprise water-soluble particles, and the solvent comprises water.

22. The method of claim 17, wherein removing the removable particles comprises one of physically contacting the removable particles with force and pneumatically contacting the removable particles with air.

23. The method of claim 17, wherein the removable particles comprise one of fluid-filled microcapsules, gas-filled microcapsules, and gel microbeads, and wherein removing the removable particles comprises heating the removable particles.

24. The method of claim 17, wherein removing the removable particles comprises selectively heating the removable particles without appreciably heating the cover.

* * * * *